3,042,685
PROCESS OF MAKING 6-FLUORO TRYPTAMINE
André Allais, Paris, and Jean Meier, Coeuilly-Champigny, France, assignors, by mesne assignments, to Roussel-UCLAF, S.A., Paris, France, a corporation of France
No Drawing. Filed Apr. 13, 1959, Ser. No. 805,690
Claims priority, application France Apr. 18, 1958
6 Claims. (Cl. 260—319)

The present invention relates to a new and valuable tryptamine compound and more particularly to 6-fluoro tryptamine, and to a process of making same.

It is one object of the present invention to provide the new and valuable 6-fluoro tryptamine.

Another object of the present invention is to provide suitable intermediates for the synthesis of said valuable 6-fluoro tryptamine.

Still another object of the present invention is to provide a simple and effective process of producing said valuable 6-fluoro tryptamine.

Other objects of the present invention and advantageous features thereof will become apparent as the description proceeds.

In principle, the present invention consists in providing the new and valuable 6-fluoro tryptamine of Formula I

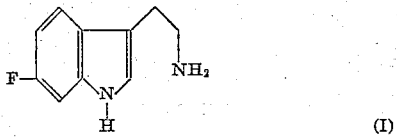

(I)

which has a melting point of 80° C. and forms a picrate of the melting point of 264° C.

This new and valuable 6-fluoro tryptamine is prepared according to the present invention by first producing the 3-nitro-4-methyl benzene diazonium fluoborate by diazotizing 2-nitro-4-amino toluene and subjecting the diazotized reaction product to the action of fluoboric acid. On heating, said fluoborate yields 2-nitro-4-fluoro toluene of Formula II of the formula sheet given at the end of the specification. Condensation of said 2-nitro-4-kuoro toluene with ethyl oxalate in the presence of an alkali metal alcoholate, such as an alkali metal ethanolate forms the alkali metal salt of 4'-fluoro-2'-nitro phenyl ethyl pyruvate. This latter compound is reduced and cyclized by means of a reducing agent in an acid medium, as for example, zinc in acetic acid, or iron in hydrochloric acid thus producing 6-fluoro indole-2-ethyl carboxylate of Formula III. Saponification of said indole derivative yields the corresponding acid of Formula IV, which is decarboxylated to 6-fluoro indole of Formula V. By condensing said 6-fluoro indole with dimethylamine and formaldehyde, the 6-fluoro indole is converted into 6-fluoro gramine of Formula VI, the metho-sulfate of which yields, on condensation with an alkali metal cyanide, 6-fluoro-3-indolyl acetonitrile of Formula VII. Catalytic hydrogenation of said compound produces the desired 6-fluoro tryptamine of Formula I.

This new compound is useful as an intermediate in the synthesis of physiologically active compounds of the reserpine family. Such reserpine compounds are obtainable therefrom by subjecting it to the known synthetic processes as they have been described, for instance, by Woodward et al., 6-fluoro tryptamine is also a powerful antimetabolite of tryptophane; it may be used in all instances in which micro-biological conversion of tryptophane into indole is to be avoided, as, for instance, in certain pathological intestinal fermentation processes.

The following examples serve to illustrate the present invention, without, however, limiting the same thereto.

More particularly, the reaction temperature, the solvents, the acids or bases used, the reaction duration, the order of introducing the reactants, and the like may be varied by those skilled in the art in accordance with the principles set forth herein and in the claims annexed hereto.

The melting points given in the examples are instantaneous melting points determined on the Maquenne block.

EXAMPLE 1

*Preparation of 2-Nitro-4-Fluoro Toluene of Formula II*

(A) FORMATION OF 3-NITRO-4-METHYL BENZENE DIAZONIUM FLUOBORATE 90 cc. of water and 270 cc. of concentrated hydrochloric acid are added to 137 g. of 2-nitro-4-amino toluene. The mixture is stirred until the orange color of the mixture disappears, and is then cooled to 0° C. The resulting hydrochloride is diazotized by the addition of 67.5 g. of sodium nitrite in 180 cc. of water. Stirring is continued until a homogeneous solution is obtained while taking care to maintain the mixture at said low temperature. Thereafter, 210 cc. of 40% fluoboric acid are added and the mixture is allowed to stand with stirring at 0° C. for half an hour. After filtering, washing the precipitate with water and with methanol, and drying, 182 g. of rose-colored crystals of 3-nitro-4-methyl benzene diazonium fluoborate are recovered. Yield: 77.0% of the theoretical yield.

(B) DECOMPOSITION OF SAID FLUOBORATE 182 g. of fluoborate prepared as described hereinabove under (A) are intimately mixed with 325 g. of dry sand. The mixture is heated directly over a flame. Heating is continued for half an hour, the temperature inside the sand mixture reaching 180° C. After cooling, the charred mass is taken up with water and distilled with steam. The distilled fractions are extracted with ether and the ether extracts are dried over sodium sulfate, filtered, and evaporated to dryness. The residue, 60 g. of a brownish-yellow liquid, is redistilled at 77° C./3 mm. Hg at which temperature the resulting 2-nitro-4-fluoro toluene passes over. The refractive index of the distilled yellow oil of Formula II, thus prepared is 1.522 at 25° C., which value agrees with the values reported in the literature.

EXAMPLE 2

*Preparation of 6-Fluoro Indole-2-Ethyl Carboxylate of Formula III*

Dry potassium ethanolate in an amount corresponding to 7.9 g. of potassium metal is covered with 100 cc. of ether. While cooling and stirring, 27.2 cc. of ethyl oxalate are added and, thereafter, very slowly 31 g. of the compound of Formula II prepared according to the preceding example. The reaction mixture is allowed to stand at room temperature for 40 hours and is then filtered, washed with anhydrous ether, and dried in a vacuum, thus yielding 44 g. of violet crystals of the potassium salt of 4'-fluoro-2'-nitro phenyl ethyl pyruvate.

This compound is dissolved in 280 cc. of ethanol and 28 cc. of acetic acid, and the solution is added dropwise to a mixture of 100 g. of iron filings, 400 cc. of water, and 14 cc. of concentrated hydrochloric acid heated to 90° C. The ethanol distills off in the course of this addition which takes 30 minutes. Heating with stirring is continued for another hour. The mixture is then cooled with ice and filtered. The filter residue consisting of iron and the resulting cyclic compound is washed with water and extracted with hot ethanol. The extracts, on evaporation in a vacuum, yield 20 g. of the compound of Formula III of the melting point 140° C. The yield is 50% calculated for 2-nitro-4-fluoro toluene. For analytical purposes the compound is recrystallized from ethanol. The melting point of the recrystallized compound is 142° C. This new compound is obtained in the form of white needles, soluble in ether and chloroform, less soluble in acetone, alcohol, or benzene, and insoluble in water and dilute aqueous acids or alkalies.

*Analysis.*—$C_{11}H_{10}O_2NF$.—Molecular weight, 207.20. Calculated: 63.76% C; 4.86% H; 6.76% N; 9.17% F. Found: 64.0% C; 4.8% H; 6.8% N; 8.9% F.

EXAMPLE 3

*Preparation of 6-Fluoro Indole-2-Carboxylic Acid of Formula IV*

20 g. of the compound of Formula III, prepared according to the preceding example, are mixed with 120 cc. of ethanol, 10 g. of potassium hydroxide in pellet form, and 100 cc. of water. The mixture is refluxed for one hour and is then filtered. 150 cc. of water are added to the filtrate which is acidified by the addition of hydrochloric acid. On cooling, the acid of Formula IV is obtained in the form of a beige-colored precipitate which is filtered and washed with water. It is then dissolved with heating in 200 cc. of water and 200 cc. of concentrated ammonia. After adding animal charcoal thereto, the mixture is filtered and the filtrate is reacidified by the addition of hydrochloric acid. The precipitate is filtered, washed with water, and dried at 80° C. 10.9 g. of the compound of Formula IV are collected, melting point: above 220° C. The yield is 63% of the theoretical yield. The compound is soluble in alcohol, ether, and acetone and insoluble in water, benzene, and chloroform. For analytical purposes the compound is recrystallized from aqueous methanol.

*Analysis.*—$C_9H_6O_2NF$.—Molecular weight, 179.14. Calculated: 60.33% C; 3.37% H; 7.82% N; 10.60% F. Found: 60.3% C; 3.3% H; 7.7% N; 10.7% F.

This compound has not been previously described in the literature.

EXAMPLE 4

*Preparation of 6-Fluoro Indole of Formula V*

17.1 g. of the compound of Formula IV, prepared according to the preceding example are introduced into 85 cc. of quinoline containing 1.7 g. of copper chromite. The mixture is heated to an internal temperature of 210–220° C. for 1¼ hour. After cooling, 200 cc. of water are added and the mixture is extracted with ether. The ether solution is extracted with concentrated hydrochloric acid until it is clearly of acid reaction, is then washed with water, with dilute ammonia, and again with water until it is neutral. After drying over sodium sulfate, the ether solution is evaporated to dryness. The residue is triturated with petroleum ether, filtered, and dried in a vacuum. Yield: 11 g. of crystals of the compound of Formula V, which is purified by distillation with steam superheated to 170° C. The distillation lasts for 30 minutes. The distillate is cooled with ice, filtered, and dried in a vacuum. 10.3 g. of the compound of Formula V of the melting point: 73° C. are obtained. Yield: 80% of the theoretical yield. This compound, which has not previously been described in the literature, is obtained in the form of small white needles, soluble in alcohol, acetone, benzene, ether, and chloroform and insoluble in water and dilute aqueous acids or alkalies.

*Analysis.*—$C_8H_6NF$.—Molecular weight, 135.13. Calculated: 71.10% C; 4.48% H; 10.37% N; 14.06% F. Found: 71.2% C; 4.6% H; 10.6% N; 14.3% F.

EXAMPLE 5

*Preparation of 6-Fluoro Gramine of Formula VI*

A mixture consisting of 26 cc. of a 23.4% aqueous solution of dimethylamine, 18 cc. of acetic acid, and 11 cc. of 30% formaldehyde is prepared at a temperature below 5° C. The temperature of the mixture is allowed to increase to room temperature. 13.5 g. of 6-fluoro indole of Formula V, prepared according to the preceding example, are then added thereto. The reaction mixture is stirred for one hour, diluted with 300 cc. of water, and rendered alkaline by washing with dilute sodium hydroxide solution. The resulting white precipitates is filtered and washed with water until neutral. It is then dried in a vacuum thus producing 18.1 g. of the compound of Formula VI of the melting point: 136.5° C. The yield is 94% of the theoretical yield. For analytical purposes the compound is recrystallized from toluene, the melting point remaining constant. This compound which has not been previously described in the literature is soluble in alcohol, ether, acetone, chloroform, and in dilute aqueous acids, slightly soluble in cold benzene, and insoluble in water and dilute alkalies.

*Analysis.*—$C_{11}H_{13}N_2F$.—Molecular weight, 192.23. Calculated: 68.72% C; 6.82% H; 14.57% N; 9.89% F. Found: 68.9% C; 6.8% H; 14.6% N; 9.8% F.

EXAMPLE 6

*Preparation of 6-Fluoro-3-Indolyl Acetonitrile of Formula VII*

(A) 6-FLUORO GRAMINE METHOSULFATE

To a mixture of 11.1 cc. of dimethyl sulfate, 11.1 cc. of tetrahydrofuran, and 0.2 cc. of glacial acetic acid, there is added drop by drop and while stirring, a solution of 6-fluoro gramine, prepared according to the preceding example, in 20 cc. of tetrahydrofuran and 0.1 cc. of glacial acetic acid. Stirring is continued for 45 minutes. The methosulfate of 6-fluoro gramine is filtered, made into a paste with ether, and used in the form of such a paste in the following reaction step.

(B) FORMATION OF THE NITRILE 4.5 g. of potassium cyanide are added to a solution of the methosulfate, prepared as described hereinabove under (A), in 100 cc. of water. The reaction mixture is heated to 60–65° C. with stirring for one hour. It is then cooled with ice and filtered. The resulting precipitate is washed with water, dilute hydrochloric acid, and again with water. After drying in a vacuum, 4.6 g. of the crude compound of Formula VII are obtained. Yield: 85% of the theoretical yield. It is used without further purification in the final reaction step. For purposes of analysis, it is purified by sublimation at 110° C./0.1 mm. Hg. Its melting point is 51–52° C.

*Analysis.*—$C_{10}H_7N_2F$.—Molecular weight, 174.17. Calculated: 68.95% C; 4.05% H; 16.09% N; 10.91% F. Found: 68.7% C; 4.1% H; 16.2% N; 10.9% F.

This compound, which has not previously been described in the literature, is soluble in alcohol, ether, acetone, and chloroform, fairly soluble in benzene, and insoluble in water, dilute aqueous alkalies and acids.

EXAMPLE 7

*Preparation of 6-Fluoro Tryptamine of Formula I*

4 g. of the compound of Formula VII, prepared according to the preceding example, are dissolved in 40 cc. of methanol saturated with ammonia. Hydrogen is passed into the solution in the presence of 4.5 g. of Raney nickel catalyst. After 2 hours of hydrogenation 850 cc. of hydrogen are absorbed. The catalyst is filtered off and the methanol is evaporated in a vacuum. The residue is dissolved in 10% acetic acid and the solution is rendered alkaline by the addition of 10% sodium hydroxide solution until the pH is 8.0. The alkalized solution is then cooled, treated with animal charcoal, and filtered. Sodium hydroxide solution is again added to the filtrate until it is clearly alkaline to phenolphthalein indicator. An oil precipitates which is converted into crystals by cooling and seeding. 6-fluoro tryptamine of Formula I is filtered, washed with water, and dried in a vacuum. Yield: 2 g.

correspoinding to 50% of the theoretical yield, melting point: 80° C. This compound which has not been previously described in the literature is somewhat unstable and turns yellow quite rapidly in air.

*Analysis.*— $C_{10}H_{11}N_2F$.— Molecular weight, 118.20. Calculated: 67.40% C; 6.22% H; 15.72% N; 10.66% F. Found: 67.3% C; 5.9% H; 16.1% N; 10.8% F.

In order to form the picrate of said compound of Formula I, 5.47 g. thereof are dissolved in 25 cc. of absolute ethanol. 7.7 g. of picric acid in 54 cc. of ethanol are added thereto. The picrate crystallizes in orange needles which are filtered off after cooling and are washed with a small quantity of ice-cold ethanol. On drying, 11.3 g. of the picrate of 6-fluoro tryptamine of the melting point: 264° C. are obtained. Yield: 90% of the theoretical yield. Recrystallization from methanol does not change the melting point. This new compound is soluble in acetone and hot ethanol and slightly soluble in chloroform, benzene, and ether. It is decomposed by dilute aqueous acids or alkalies.

*Analysis.*—$C_{16}H_{14}O_7N_5F$.—Molecular weight, 407.31. Calculated: 47.18% C; 3.46% H; 4.66% F. Found: 47.3% C; 3.5% H; 5.0% F.

EXAMPLE 8

*Utilization of 6-Fluoro Tryptamine as an Antimetabolite of Tryptophane*

A culture medium having the following composition is prepared:

| | G. |
|---|---|
| Heart extract | 1.5 |
| Yeast autolyzate | 1.5 |
| Casein peptone | 5.0 |
| Sodium chloride | 3.5 |
| $K_2HPO_4$ | 3.68 |
| $KH_2PO_4$ | 1.32 |
| $KNO_3$ | 2.0 |
| Glucose | 1.0 |
| Water to yield a volume of 1000 cc. | |

30 cc. of the culture medium are filled under sterile conditions into each flask. 6 mg. of tryptophane are added to each flask. The compound to be tested is then admixed to the culture medium in each flask in quantities increasing from 0.3 mg. to 30 mg. per flask. The flasks are inoculated with *E. coli* (strain ATCC 11105) and the inoculated culture media are kept on a shaking apparatus at a temperature of 37° C. for 48 hours. When incubation is completed, the quantity of indole formed is determined by titration by following the technique described by L. H. Chernoff (Ind. Eng. Chem., Analytical Edition, vol. 12, page 213 (1940)), after having ascertained that the microbial growth has developed normally. It was found that the addition of 6-fluoro tryptamine to the culture medium in an amount of 0.05 g./liter is sufficient to inhibit formation of indole.

As stated hereinabove, reduction of the alkali metal salts of the lower alkyl ester of 4'-fluoro-2'-nitro phenyl pyruvic acid may also be effected by means of zinc in acetic acid solution.

Other quaternary ammonium compounds of 6-fluoro gramine than the methosulfate may be prepared such as the methobromide, the toluene sulfonate, and the like although the methosulfate has proved to be especially suitable for conversion into the nitrile.

It is understood, of course, that other acid addition salts of 6-fluoro tryptamine than the picrate may be produced, for instance, addition salts with inorganic acids such as hydrochloric acid, hydrobromic acid, nitric acid, sulfuric acid, phosphoric acid, or organic acids such as acetic acid, propionic acid, oxalic acid, maleic acid, malonic acid, succinic acid, citric acid, malic acid, tartaric acid, benzoic acid, salicylic acid, phthalic acid, nicotinic acid, and others.

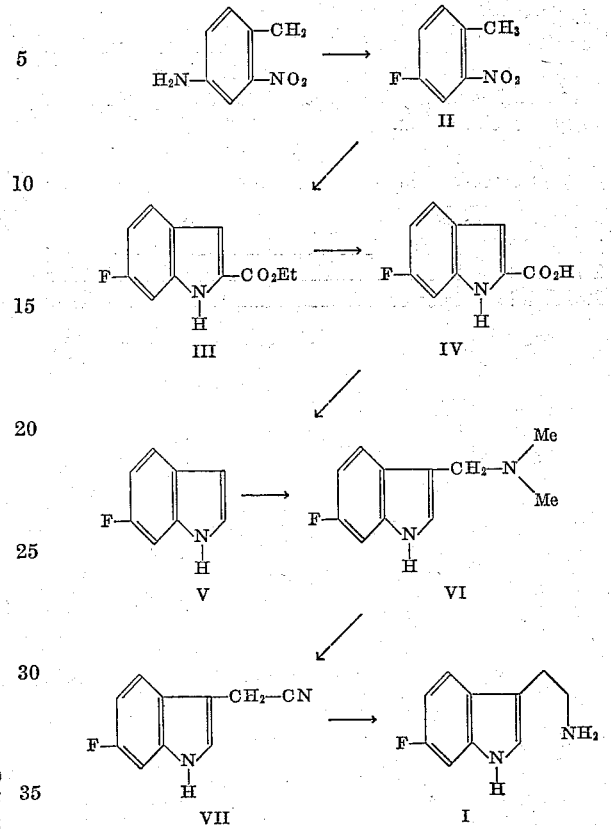

We claim:
1. In a process of producing 6-fluoro tryptamine, the steps which consist in
   (a) subjecting 6-fluoro indole to the action of formaldehyde and dimethylamine in an aqueous acidic medium to produce 6-fluoro gramine;
   (b) stirring said 6-fluoro gramine with dimethyl sulfate in an inert organic solvent to cause quaternization;
   (c) adding an alkali metal cyanide to an aqueous solution of the resulting methosulfate of 6-fluoro gramine and heating to 60–65° C.; and
   (d) hydrogenating 6-fluoro 3-indolyl acetonitrile produced thereby to 6-fluoro tryptamine by means of hydrogen in the presence of a nickel catalyst and a lower alkanol saturated with ammonia.

2. A process of producing 6-fluoro-indole which comprises the steps of
   (a) subjecting 2-nitro-4-fluoro-toluene to the action of a lower alkyl ester of oxalic acid in the presence of an alkali metal lower alkanolate to yield the alkali metal salt of the lower alkyl ester of 4'-fluoro-2'-nitro phenyl pyruvic acid;
   (b) reducing said ester by means of a reducing metal in the presence of an acid medium;
   (c) saponifying the resulting 6-fluoro indole-2-carboxylic acid ester by means of an alkali metal hydroxide in alcoholic solution to 6-fluoro indole-2-carboxylic acid;
   (d) heating said carboxylic acid in an inert solvent to temperatures below 220° C. to split off carbon dioxide;
   (e) and recovering said 6-fluoro-indole.

3. The process according to claim 2, wherein the alkali metal alcoholate in step (a) is potassium ethanolate and wherein the potassium salt of the ethyl ester of 4'-fluoro-2'-nitro phenyl pyruvic acid is obtained and subjected to reduction in accordance with step (b).

4. The process according to claim 2, wherein the reducing agent in step (b) is iron in a hydrochloric acid medium.

5. The process according to claim 2, wherein the reducing agent in step (b) is zinc in an acetic acid medium.

6. The process according to claim 1, wherein catalytic hydrogenation in step (d) is effected in the presence of Raney nickel catalyst.

References Cited in the file of this patent

UNITED STATES PATENTS

| | | |
|---|---|---|
| 2,715,129 | Hamlin | Aug. 9, 1955 |
| 2,728,778 | Speeter | Dec. 27, 1955 |
| 2,825,734 | Speeter | Mar. 4, 1958 |
| 2,870,162 | Speeter et al. | Jan. 29, 1959 |
| 2,901,483 | Kuehne | Aug. 25, 1959 |

FOREIGN PATENTS

| | | |
|---|---|---|
| 1,201,548 | France | Dec. 30, 1959 |

OTHER REFERENCES

Beilstein: Vol. 22, 2nd Supp. (1953), page 51.

Quadbeck et al.: Hoppe-Seyler's Z. Physical Chem., vol. 297 (1954), pages 229–237.

Allen et al.: J. Chem. Soc. (London), 1955, Part II, pages 1283–1286.

Brown et al.: J. Amer. Chem. Soc., pages 3839–42, vol. 77 (1955).

Velluz: Annales Pharmaceutiques Francoises, pp. 15–26 (January 1959).